United States Patent [19]

Kacic

[11] Patent Number: 5,730,084
[45] Date of Patent: Mar. 24, 1998

[54] LITTER BOX WITH ABRASIVE SURFACE

[76] Inventor: Alan D. Kacic, 6119 N. Black Bear Loop, Tucson, Ariz. 85715

[21] Appl. No.: 706,774

[22] Filed: Sep. 3, 1996

Related U.S. Application Data

[63] Continuation of Ser. No. 374,324, Jan. 18, 1995, Pat. No. 5,564,365, which is a continuation-in-part of Ser. No. 209,955, Mar. 10, 1994, abandoned.

[51] Int. Cl.$^6$ ........................................... A01K 29/00
[52] U.S. Cl. ........................................... 119/165
[58] Field of Search ........................... 119/165–170

[56] References Cited

U.S. PATENT DOCUMENTS

| | | | |
|---|---|---|---|
| 428,427 | 8/1890 | Fletcher | 273/75 |
| 1,162,427 | 11/1915 | Wolff. | |
| 4,360,557 | 11/1982 | Miller | 428/142 |
| 4,938,784 | 7/1990 | Murakami et al. | 51/293 |
| 5,163,975 | 11/1992 | Martin | 51/293 |
| 5,235,934 | 8/1993 | Runion | 119/51.01 |
| 5,564,365 | 10/1996 | Kacic | 119/165 |

*Primary Examiner*—Thomas Price
*Attorney, Agent, or Firm*—Eugene R. LaRoche

[57] ABSTRACT

A litter box for domestic cats or other domestic mammals has interior surfaces which are abrasive and that dull the claws of a cat when it uses the litter box. Abrasive material may be incorporated into the surfaces of the box, can be sprayed or rolled on the surfaces or can take the form of a thin flexible sheet of abrasive sheet material which is adhered to the surfaces of the box. Sheets are constructed to fit the side surfaces, end surfaces and bottom surface. The sheets can be adhered with a permanent or with an easily removable adhesive. The easily removable sheets can be replaced when worn. The sheets may include waterproofing material and/or scented material and may be imprinted with a design pattern.

12 Claims, 2 Drawing Sheets

LITTER BOX WITH ABRASIVE SURFACE

This application is a continuation of application Ser. No. 08/374,324, filed 01/18/95, now U.S. Pat. No. 5,564,365, which is a continuation-in-part of application Ser. No. 08/209,955, filed 03/10/94, abandoned.

FIELD OF THE INVENTION

This invention relates to litter boxes for litter bearing mammals, such as cats and rabbits, and more particularly to a litter box having an abrasive interior surface to dull the claws of pets, such as cats or rabbits.

BACKGROUND OF THE INVENTION

Domestic house cats are the favorite pet of families in the United States. Their number is in excess of approximately 67 million. A cat has remarkable grace, agility and a faultless sense of balance. To a great extent, this is due to its ingeniously designed, retractable claws that allow it to establish footing for walking, running, springing, climbing or stretching. The problem with domestic cats is that they love to scratch with their claws, damaging furniture and surfaces in homes and apartments. Domestic cats, unlike cats in the wild, do not have the ability to wear their claws down from their razor sharpness through contact with the earth and other rough surfaces. The surroundings for domestic cats do not permit them to frequently come in contact with rock-hard surfaces, soils or trees. Instead, the cats' claws are cushioned by carpet, linoleum and upholstered furniture. Because these soft surfaces do not wear down the cats' claws, cat owners suffer serious scratches on the skin and significant furniture damage.

Cat owners who reside in rental properties such as apartments and homes are constantly aware of the damage that can be done by a cat's claws. They can damage not only individuals but also their surroundings as well as furniture. Cats like to exercise by grabbing surfaces with their claws. A solution to the damage caused by the sharp claws of domestic cats is to have the claws surgically removed, have the muscles cut (tendonectomy) or to trim them on a regular basis (approximately four times per month). The American and National Humane Societies, among others, consider removal of the claws and tendonectomy to be inhumane acts. Scratching and clawing are inherent in cats. Removal of the claws creates an imbalance that can lead to physical injury and to psychological damage. The physical effect of de-clawing is gradual weakening of the muscles of the legs, shoulders and back and balance is impaired. Emotionally, cats feel defenseless and thus live in a constant state of stress, making them more prone to disease. It is clear that de-clawing, while effective, is inhumane and is considered by many cat owners to be an uneducated and unacceptable choice.

Another alternative is to trim or manicure the cat's claws on a regular basis. This is costly and time consuming and often requires a skilled animal handler or a veterinarian to do the job. Improper trimming of the claws is painful and can result in harm to the cat. Inexperienced cat owners who attempt to trim their cat's claws often trim them too severely and cause bleeding and severe pain for the cat.

Scratching posts are available which allow a cat to exercise it's claws harmlessly. These are merely carpeted poles and thus do nothing to lessen the sharpness of the claws. Cat owners wish to train their cats to use the scratching post instead of the furniture to exercise their claws, but are seldom successful.

While the discussion has been specifically directed to domestic cats, it is to be understood that a similar problem exists with other domesticated mammals, such as rabbits and ferrets, which are kept as pets in the home.

What is needed to solve this problem is something that a domestic cat or other domesticated mammal will frequently come into contact with which will wear down the claws or nails, thus dulling their sharpness and limit the damage done by the claws or nails. It would also be advantageous for the claws or nails to be worn down automatically while the cat or other mammal is going through it's normal daily routine in the home environment.

OBJECTS OF THE INVENTION

It is an object of the invention to provide a means by which a domestic mammal will automatically and painlessly wear down it's claws or nails.

It is another object of the invention to provide an abrasive surface for litter boxes that dulls the claws of a cat when it uses the litter box.

It is another object of the invention to provide a claw dulling surface for cat litter boxes.

It is another object of the invention to provide a litter box which has claw dulling abrasive interior surfaces.

It is a further object of the invention to provide an easily replaceable claw dulling abrasive surface on the interior of a cat litter box.

It is yet another object of the invention to provide an abrasive claw or nail dulling surface which can be readily applied to an existing litter box.

BRIEF DESCRIPTION OF THE INVENTION

Cats create waste on the average of three to five times per day. Most are trained by their owners to use a litter box. The litter box is filled with a scented absorbing material that allows the cat to bury it's waste. During burial of the waste, cats use their claws in a scratching motion to move the litter material and their claws come into scratching contact with the side and/or bottom of the litter box. This is an excellent opportunity to wear down their claws, dulling them and minimizing the damage that can be caused by the claws. The present invention seeks to capitalize on this natural and necessary activity of cats by providing an abrasive surface on the bottom and/or sides of a litter box so that a cat's claws will be dulled automatically when the cat uses the litter box. This eliminates the need to trim or manicure the cat's claws or to have them surgically removed.

Extensive research and experimentation has been conducted by the inventor to determine the feasibility and best mode of the invention. One way of providing the abrasive material on the interior surfaces of a litter box is to incorporate the abrasive material into the injection molding process during manufacture. Research indicated that this approach is technically feasible but would be expensive because of the extreme wear to the injector caused by the abrasive material. Alternatively, an abrasive material can be directly applied to the interior surfaces of a litter box, such as by spraying or rolling. This approach is also technically feasible but presents environmental problems due to the extreme volatility of the adhesives used. The preferred way of providing the abrasive material on the interior surface of the litter box is to adhere an abrasive sheet material to the sides and/or bottom of an existing litter box. During experimentation, different combinations of abrasive materials, adhesives, and substrate materials were adhered to the inside surfaces of litter boxes and the condition of the claws, as well as the behavior, of the cats using these litter boxes was observed over a period of time. In this way it was discovered that unless the adhesive was tasteless and odorless upon setting, the cats refused to use the litter box. Due to their sensitive sense of smell, the cats were repelled by the odor of the adhesive. It was also observed that some cats would chew on the material, thus mandating that the adhesive be non-toxic to mammals. In this way it was also determined that sand paper was not suitable for use as the abrasive material, at least on the bottom of the box, because the paper was too porous and not sufficiently resistant to cat urine, in extreme odor and mildew problems. In fact, the inventor was unable to find any commercially available abrasive sheet material suitable to this application. Therefor, the inventor developed the abrasive sheet material, which will be described in detail below, specifically for application to the inside of a litter box.

The effect on the cats of various degrees of coarseness of the abrasive material was also observed. It was discovered that if the abrasive were too rough or course, the cat did not fully follow through on it's scratching/litter covering pattern, whereby the necessary wear to the claws was not obtained. If the abrasive were too fine, the claws were not sufficiently dulled. In this manner, it was determined that an abrasive surface with a 240 to 320 grit was smooth enough to allow the cat to fully follow through on it's scratching/litter covering pattern but still course enough to significantly dull the claws. The experimental results also indicated that the smoother feel on the side panels was particularly important with respect to follow through because of weight displacement; that is, most of the cat's weight is outside the box while one claw is in motion when the side panel is scratched. Therefor, it was determined that, in the preferred embodiment, the side panels are to be approximately 320 grit and the bottom is to be approximately 240 grit.

The present invention takes the form of a sheet or sheets of material having an abrasive coating on one surface and an adhesive on the other surface so that the sheets of material can be adhered to the interior of a litter box and the abrasive coating will wear down the claws of a cat which uses the litter box. Preferably, the sheet of material is cut to fit the litter box and comprises five pieces shaped to line the sides and bottom of the box.

The abrasive material is applied to a durable, flexible plastic base that makes it easy to apply the sheet material on the inner surfaces of the litter box. The abrasive sheet material can be manufactured and sold as a single sheet which can be cut by the user to fit a particular litter box or, preferably, the abrasive sheet material is produced in various sizes applicable to a variety of litter boxes and packaged and sold in kit form containing four side panels and a bottom panel. As the term is used herein, a "panel" refers to a piece of abrasive sheet material which has been sized to fit on or is adhered on one of the interior surfaces of a litter box. Alternatively, the sheet material is applied to the interior surfaces of litter boxes during or immediately after manufacture of the boxes and the boxes are packaged and sold with the panels in place. The substrate material is preferably polyethylene terephthalate, referred to as PET for convenience. The substrate material may have a decorative pattern imprinted on it for changing the appearance of the box. The adhesive may be of the type which will allow the panels to be easily removed whereby the user can replace the panels when worn or change to a different decorative pattern. Alternatively, the adhesive may be of the type whereby the panels are permanently attached to the box. The permanent type adhesive is preferred when the boxes are packaged and sold with the panels already attached. The abrasive is preferably an environmentally safe abrasive material as approved by the Environmental Protection Agency (EPA). Since the side panels will not be exposed to standing moisture (i.e., urine), a wet/dry paper that carries the same non-toxic adhesive as the PET sheet and an EPA approved abrasive can be used.

In the preferred embodiment, an abrasive surface of aluminum oxide having a grit size of approximately 240 to 320 is formed on one surface of a thin sheet of PET. Aluminum oxide is the preferred abrasive because it is more environmentally sound than other alternatives such as silicon dioxide products or flint in view of the airborne emissions which result from scratching. In order for the thin PET or wet/dry paper sheet material to hold the aluminum oxide in place, a resin is applied over the aluminum oxide. The resin is applied to one surface of the substrate, aluminum oxide abrasive is applied on the resin, and then more resin is applied over the aluminum oxide. This is called a resin on resin process. Other methods of affixing the abrasive to the substrate can be utilized as will be described hereafter. The resin may have waterproofing characteristics to prevent the cat urine from penetrating into the PET.

After the litter box is lined with the abrasive sheet, cat litter is added into the box to a depth of approximately one and one-half inch. When a cat uses the litter box, the abrasive material, working within the bounds of nature, takes advantage of the instincts of the cat to scratch and claw in order to cover it's waste with litter. The scratching and clawing will cause the claws to come into contact with the abrasive surface, wearing and dulling the claws. In addition, the abrasive surface roughs the bottom of the cat pad thereby promoting secretion of marking oils.

The adhesive may be chosen so as to allow the panels to be easily replaced without the necessity of replacing the litter box. The adhesive is applied to the back of the sheet material and is covered by release paper. Thus, the panels can be changed when worn if the litter box is otherwise usable. Likewise, the cat owner can change the color or pattern of the abrasive surfaces at will. Such designs as cat paws, tiger stripes, leopards, or other suitable design may optionally be incorporated into the sheet material for cosmetic purposes. To apply the abrasive sheet material to the litter box, it is cut to fit the shape of the interior surfaces of the box, the release paper is peeled off and the panels are fitted and adhered to the appropriate surfaces. Alternatively, the adhesive may be chosen to provide permanent attachment of the panels to the litter box. When permanent adhesive is used, it is preferable to attach the panels to the litter box during or immediately after manufacture of the box and package the box with the abrasive surfaces as a finished product.

The above, and other novel features of the invention will be more fully understood and appreciated from the following detailed description and the accompanying drawings.

DETAILED DESCRIPTION OF THE INVENTION

Figure 1:
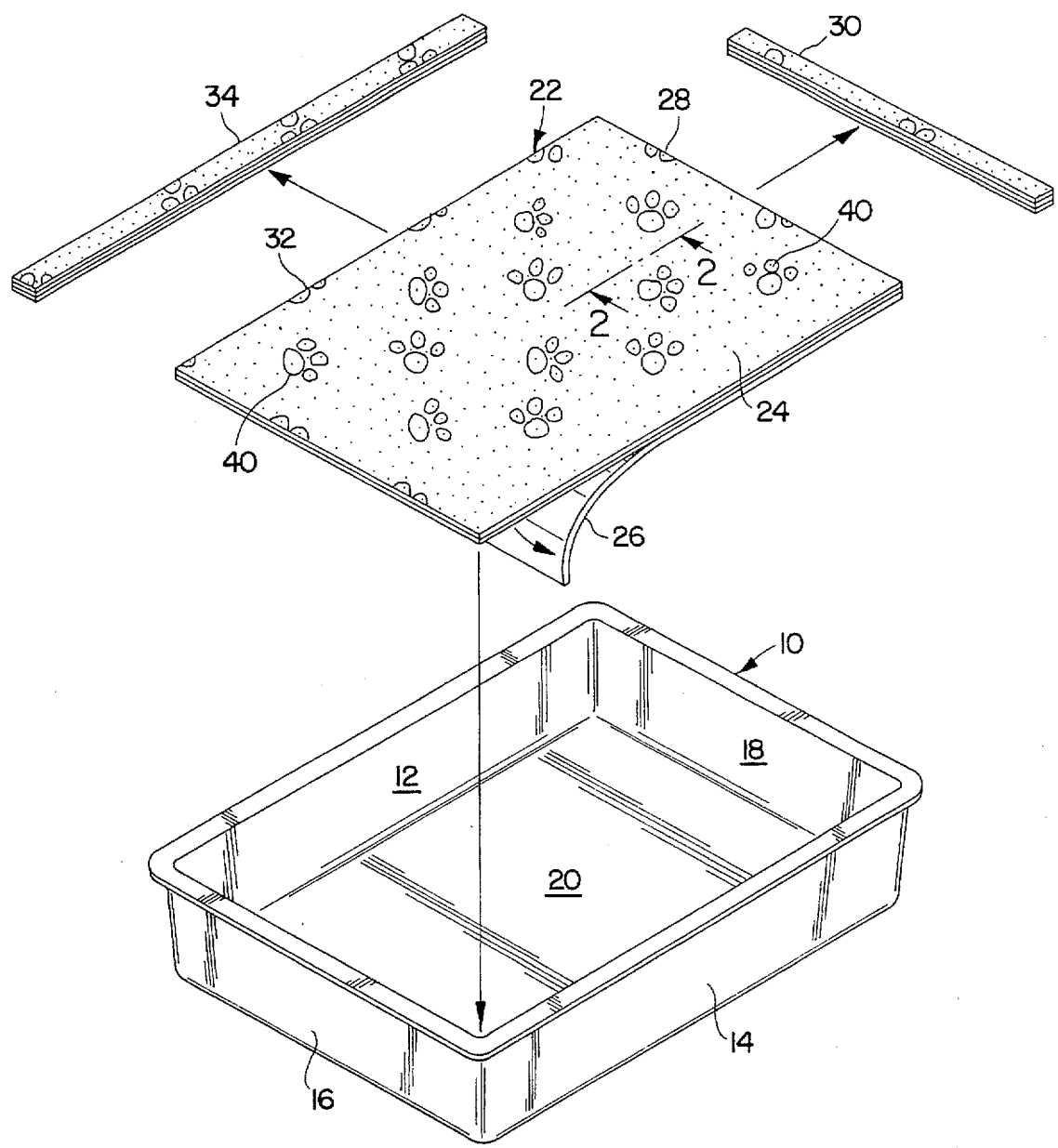
FIG. 1 is a prospective view of a litter box and an abrasive sheet material being applied to the interior surface of the box.

A litter box 10 suitable for use by domestic cats or other small domestic mammals is shown generally in FIG. 1. Such litter boxes are usually rectangular in shape and have sides 12 and 14, ends 16 and 18, and a flat bottom 20. They are designed to contain a scented absorbing litter material as will be described in greater detail hereinafter. When cats use the litter box they instinctively scratch in the box to cover their waste. The present invention provides an abrasive sheet material 22 that can be cut to fit the interior surfaces of litter box 10. Abrasive sheet material 22 has an abrasive material 24 on the upper surface and an adhesive on the bottom surface temporarily covered by release paper 26.

In FIG. 1, the abrasive sheet material 22 is shown being applied to bottom 20 of litter box 10. Abrasive sheet material 22 is cut at end 28 removing material 30 and cut at side 32 to remove material 34 to size the abrasive sheet material 22 to the proper size to fit on bottom 20 of litter box 10. In some cases little or no sizing is required. Preferably, abrasive sheet material 22 is constructed to fit the largest size litter box available and need only be trimmed to fit the bottom surface of smaller boxes.

While a single sheet of abrasive sheet material can be applied to all interior surfaces 12, 14, 16, 18, and 20 of litter box 10, it is preferable to apply a separate sheet to each of the interior surfaces. This makes application of the abrasive sheet material easier, as a single sheet would be difficult to fit into the corners, particularly when there is adhesive on it. Abrasive sheet material can be made large enough to produce two cut end pieces 30 and two cut side pieces 34 with the end and side pieces being large enough for application on the interior of ends 16 and 18 and on the interior sides 12 and 14. Alternatively, the abrasive sheet material can be pre-cut in five pieces to fit a typical litter box and packaged and sold in kit form. Preprinted cut lines may be applied to the abrasive sheet material to simplify installation.

Another advantage of separate sheets of abrasive material is that individual worn panels can be easily removed or replaced or different types of abrasive sheet material, such as wet/dry paper, can be used for the side and end surfaces than for the bottom surface. Still another advantage is that a secure adhesive seal for each panel can be uniformly achieved in spite of varying molding measurements of different litter boxes made by different manufacturers.

As previously mentioned, the abrasive sheet material may be permanently adhered to the interior surfaces of the litter boxes. This is especially advantageous when the abrasive sheet material is applied prior to sale so that product being sold is a litter box with abrasive interior surfaces. One advantage is that the user does not have to cut up the abrasive sheet material or apply the abrasive sheet material him or her self. Thus, this form of the product is more convenient. Also, panels which are permanently adhered will not peel off or otherwise come off the box prematurely. Also, panels put on the box by the manufacturer are more likely to fit better, seal better and look better than those attached by the user. The disadvantage to this embodiment is that the entire box must be replaced when the abrasive material is worn or otherwise no longer effective.

Figure 2:
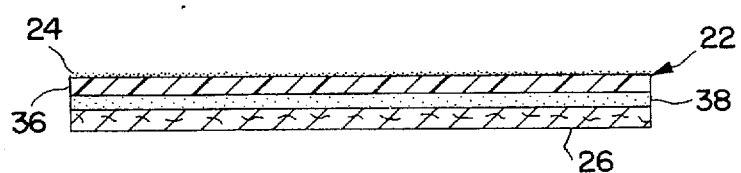
FIG. 2 is a sectional view of the abrasive sheet material of the invention.

One embodiment of the abrasive sheet material 22 to be placed on the interior surfaces of litter box 10 is shown in FIG. 2. The base or substrate of the abrasive sheet material 22 is a thin, flexible plastic sheet material 36. The preferred material for the base or substrate 36 is a 3 mil sheet of polyethylene terephthalate (PET) due to excellent strength and chemical resistance in this application. Other flexible plastic materials are suitable for use; for example, polymer film materials such as polypropylene, cellulose acetate, polystyrene, polyvinylidene chloride (PVDC) can be used. Nylon or cellophane can also be used but tend to be more costly.

The upper surface of plastic sheet material 36 is covered with an abrasive material 24. The preferred abrasive has a grit size of approximately 240 to 320. The preferred process for affixing the abrasive to the substrate is the resin on resin process described above. As an alternative, the abrasive material can be produced by adding an abrasive to a resin and then applying it to the surface of plastic sheet material 36 as a slurry coating. The abrasive is first wetted with an acceptable wetting agent such as a solvent. The abrasive is then added to and thoroughly mixed with a suitable resin which prevents segregation and settling of the abrasive. As another alternative, the abrasive may be applied to the substrate and the suitable resin is sprayed or rolled over the abrasive. The abrasive may be selected from common ceramic abrasives such as silicon carbide (SIC), aluminum oxide, commonly called alumina ($Al_2O_3$), zirconia ($ZrO_2$), zirconia alumina ($ZrO_2$—$AlO_3$), garnet, and flint ($SiO_2$, silicon, quartz). Alumina is the preferred choice for the abrasive because it is highly inert and very hard. It is also very common, relatively inexpensive, and will not have any chemical interaction with a desired bonding resin. Other materials that can be used are include tripoly, emery and crocus for fine polishing. In the preferred embodiment, the abrasive is alumina having a grit size approximately 240 to 320.

The bonding resin may be selected from bonding materials such as rubber, shellac, a urethane such as polyurethane, epoxy, polyamide and other alkyd resin bonds. Phenylformaldehyde (resinoid) compositions and vitrified (glassy) compositions can also be used to bond abrasives to a surface. However, the preferred material is a urethane. It is relatively easy to use, less expensive than other alternatives and will not interact with the selected abrasive. The lower surface of sheet 36 is covered by adhesive layer 38. A sheet of release paper 26 covers the adhesive layer 38.

Figure 5:
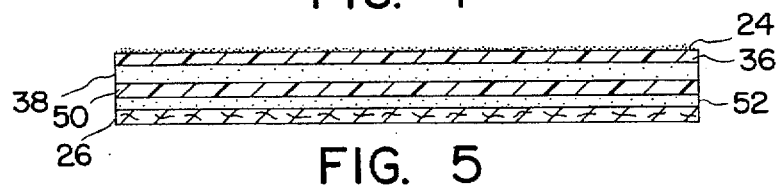
FIG. 5 is a sectional view of a second, preferred embodiment of the abrasive sheet material of the invention.

A second embodiment of the abrasive sheet material is shown in FIG. 5, wherein a second sheet 50 of polyethylene terephthalate has it's upper surface affixed to the lower surface of substrate 36 by a layer of adhesive 38. In the preferred embodiment, this second sheet is 0.5 mil. The lower surface of second sheet 50 has a second layer of adhesive 52. Release paper 26 is shown covering second adhesive layer 52. In either embodiment, the adhesive may be a low tack adhesive which will provide sufficient adhesion to securely hold the abrasive sheet material in place in the litter box but still allow easy removal and replacement when desired by the user. Alternatively, the adhesive may be of the type to provide a permanent attachment to the litter box surfaces. A preferred adhesive for permanent attachment is a rubber based adhesive. Normally, although not necessarily, the adhesives 38 and 52 of FIG. 5 will be the same for convenience of manufacture. The laminated structure, that is, the two sheets 32 and 50 being adhered together, provides a combination of flexibility and strength which would not be achieved with a single sheet thicker than 3 mil.

Although the sheet or sheets of polyethylene terephthalate and the resin provide a water resistant barrier, a waterproofing treatment, such as a waterproofing silicon treatment, can be applied to further protect the abrasive sheet material from the effects of cat urine.

The abrasive sheet material can be sized to fit the largest of litter boxes or can be several sizes. These sizes range from a large jumbo size box of approximately 6.5 inches by 22 inches to a small size box of approximately 3.5 inches by 10 inches. With these dimensions, panels for sides 12, 14 and ends 16, 18 would be at least 6 inches high by about 24 inches long. The panel to cover the bottom surface 20 is also sized to fit the largest litter box.

Figure 3:
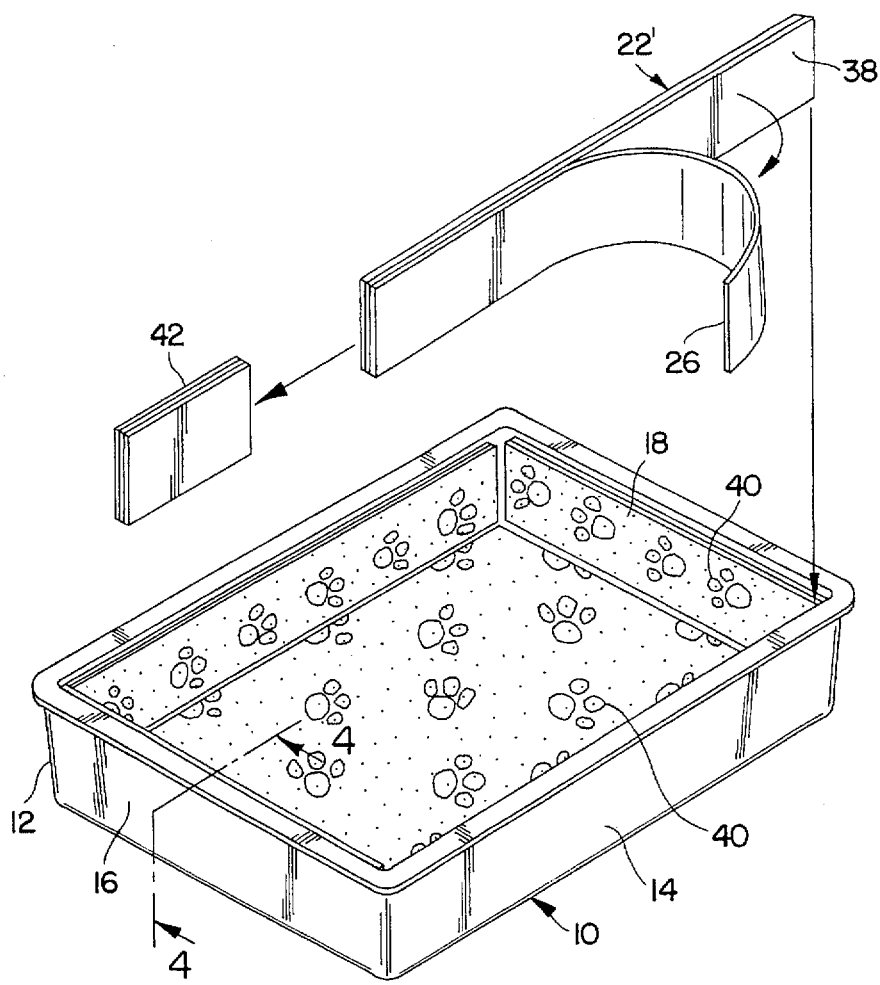
FIG. 3 illustrates the fitting and application of the abrasive sheet material to the interior of a litter box.
Figure 4:
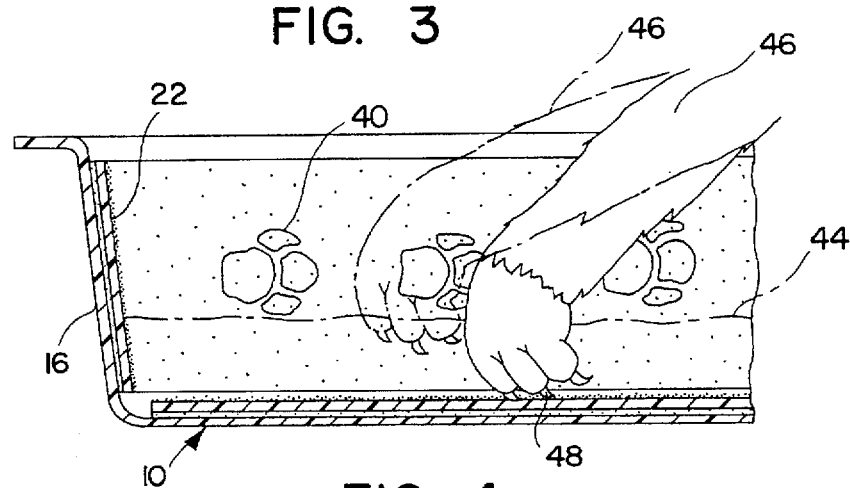
FIG. 4 shows a litter box containing absorbing litter and lined with the abrasive sheet material of the invention having decorative patterns. This figure also illustrates the action of a cat scratching the abrasive surface on the bottom of the litter box.

Attractive or decorative patterns 40, shown in FIGS. 3 and 4, can be incorporated into the abrasive sheet material. Polyethylene terephthalate is very suitable for this purpose because it has high chemical and thermal stability, is very durable, has relatively low thermal expansion, and has low shrinkage. It is easily coated with printing inks as well as adhesives, exhibits high strength, has excellent tear resistance and is very moisture resistant and resistant to acids, bases, and solvents. If a pattern is desired, preferably the substrate or base sheet 36 is imprinted prior to being processed with resin, abrasive or adhesive. When used in the litter box, the patterned panels will provide aesthetically pleasing decor in addition to the function of dulling the cat's claws.

Scents can be added to the abrasive sheet material to encourage scratching and act as a deodorant. The scent is added to the resin or impregnated beneath the resin and abrasive layer. Scents known to attract cats or stimulate cats into wild and playful behavior, such as oil scents from catnip leaves, are suitable for this purpose. Although a portion of the scent will evaporate over time, some of the scent material is trapped by a polymer chain or absorbed into the film or abrasive surface. The absorbed or trapped scent material will be released when the abrasive sheet material is scratched by the cat.

Application and use of the abrasive sheet material of the invention is shown in FIGS. 3 and 4. Each of the interior surfaces of the litter box 10 is at least partially covered by removing release paper 36 and pressing each panel in place. FIG. 3 shows panel 22' being applied to side 14 of the litter box 10 already having panels applied to the other side, the ends and the bottom. Side panel 22' is sized by cutting off piece 42, the release paper 26 is removed and the adhesive surface of the panel is pressed against side 14. Thus, an attractive, scented abrasive surface is provided on the interior surfaces of litter box 10.

FIG. 4 shows a cat scratching in a litter box whose interior surfaces include abrasive sheet material 22 and which is partly filled with absorbent cat litter 44 to a depth of about one to one and one-half inches. After depositing waste in the litter box, a cat will dig in the litter 44 with paws 46, scratching the surface of abrasive sheet material 22 with it's claws 48, thus wearing down the claws. The recommended litter depth of about one to one and one-half inches is less than traditionally used in litter boxes which do not utilize the present invention. The decreased depth of litter increases the interaction of the cat's claws with the abrasive material on the bottom of the litter box.

Although much of the above disclosure relates to the specific embodiment, especially the novel abrasive sheet material, for carrying out the present invention, it is to understood that the invention is not limited by the embodiment shown in the drawings and described in the specification but only in accordance with the scope of the accompanying claims.

What is claimed is:

1. A litter box for domestic cats and other litter using animals comprising:
   a container having interior side surfaces, end surfaces and a bottom surface for holding cat litter; and,
   an abrasive means disposed on at least said bottom surface of the box for dulling the claws of a cat or animal when the claws are scratched on said abrasive means by the cat or animal when using the litter box.

2. The litter box of claim 1 in which said abrasive means comprises an abrasive sheet material adhered to at least the bottom surface of the litter box.

3. The litter box of claim 2 in which said abrasive sheet material comprises a thin flexible substrate, an abrasive affixed to one surface of the substrate and an adhesive on the other surface of the substrate, whereby the abrasive sheet material can be adhered to an interior surface of the litter box by means of said adhesive.

4. The litter box of claim 3 wherein said substrate is selected from the group consisting of polyethylene terephthalate, polypropylene, cellulose acetate, polystyrene, polyvinylidene chloride, nylon and cellophane.

5. The litter box of claim 3 wherein said abrasive is selected from the group consisting of aluminum oxide, silicon carbide, zirconia, zirconia alumina, garnet and flint.

6. The litter box of claim 5 wherein said abrasive is aluminum oxide.

7. The litter box of claim 6 wherein said aluminum oxide abrasive is affixed to the substrate with a urethane resin.

8. The litter box of claim 3 wherein said adhesive provides permanent adhesion of said abrasive sheet material to the interior surface of the litter box.

9. The litter box of claim 2 wherein said abrasive sheet material includes a scent which is attractive to cats.

10. The litter box of claim 2 wherein said abrasive sheet material has a design, color, or pattern imprinted thereon.

11. The litter box of claim 2 wherein said abrasive sheet material includes a waterproofing material.

12. The litter box of claim 1 wherein said abrasive means is disposed on the interior side surfaces, the interior end surfaces and the interior bottom surface of the litter box.

* * * * *